US005574242A

United States Patent [19]

Bui

[11] Patent Number: 5,574,242

[45] Date of Patent: Nov. 12, 1996

[54] SONG CODING FOR OPTIMAL PERFORMANCE

[76] Inventor: Phiet T. Bui, 16 Cordoba, Irvine, Calif. 92614

[21] Appl. No.: 308,589

[22] Filed: Sep. 19, 1994

[51] Int. Cl.[6] .......... G09B 15/00

[52] U.S. Cl. .......... 84/483.1; 84/483.2

[58] Field of Search .......... 84/483.1, 483.2

[56] References Cited

U.S. PATENT DOCUMENTS 1,539,308 5/1925 Faunt .......... 84/483.2

3,700,785 10/1972 Leonard .......... 84/483.1

4,434,698 3/1984 Oberlander .......... 84/483.2

*Primary Examiner*—Patrick J. Stanzione

[57] ABSTRACT

A novel and simple method for coding or indexing songs according to their highest and/or lowest sung notes, and the corresponding keys or tonalities, is proposed. Numbers 1 through 12 are used in lieu of the musically more erudite traditional musical appellations. Individual voices can be coded or indexed similarly. When the songs are transposed to the proper tonalities, so that all the sung notes are within the vocal range of the individual singer, the performance will enjoy optimal vigor and minimal strain.

1 Claim, No Drawings

SONG CODING FOR OPTIMAL PERFORMANCE

BACKGROUND OF THE INVENTION

1. Field of Invention

This invention relates to a method and process whereby songs can be coded or indexed to render their performance more optimal and satisfying for listeners and perfomers alike, inlcuding those without extensive musical training.

2. Description of the Prior Art

Regardless of one's musical training, singing can be a healthful and pleasurable activity, and performing for others can be an enriching experience.

Yet because each song is written in one key, while different people have different vocal ranges, the song, as written, may be optimal for only a small percentage of amateur singers, and too high or too low for all the others.

As more and more people discover the joy of performing, as indicated by the growing popularity of sing-along activities, both at home, and in commercial institutions such as restaurants, karaoke bars, and nightclubs, there is a need for a simple method to adjust the music to fit the vocal capabilities of individual amateur performers.

This invention proposes to accomplish this through a method for coding or indexing songs to facilitate their optimal performance.

Most songs are written in one of twenty four tonalities, or keys. The simpler ones are C major, A minor, F major, D minor, G major, and E minor. A trained singer can glance at any printed song and, in a matter of seconds, decide if it was in the right key for him or her to perform, and if not, what would be the optimal key to transpose the music to. For the average amateur singer however, this kind of musical computation seems out of reach. But this doesn't have to be.

SUMMARY OF THE INVENTION

Supposing that you have decided to sing a certain song. It would be rare indeed that the song would happen to be written in the very key which is optimal for your voice, that is for maximum effectiveness and minimum strain. If not, then the song should be transposed to the best key for optimal performance.

The information that you need will be: 1) What is the key that the song is written in ?2) What are the song's highest and lowest notes in that key ?3) What are the highest and lowest notes that you can comfortably sing ?and 4) What are the keys that the song can be transposed to, so that its highest and lowest notes will not be higher and lower respectively, than the highest and lowest notes that you can sing comfortably ?

At the present time, only professional musicians or very gibed amateurs can answer these questions readily and easily.

The proposed coding or indexing in this invention will reduce the above complicated process into, typically, a simple comparison of two small numbers. The first number is characteristic of each performer and it changes very little, if at all.. The second number is characteristic of each song, and it never changes.

Let us suppose that you wish to perform with a live band at a wedding party. If the song has the proposed coding or indexing, all you have to do is look up for the key corresponding to your number and let it be known to the lead musician. Then you can be sure to be able to reach the highest note with vigor and comfort.

DESCRIPTION OF THE PREFERRED EMBODIMENTS

The principal feature of the proposed invention is a method of coding or indexing each song by hits highest and/or lowest sung notes.

In the first embodiment, the usual musical notations such as A, B, C, D, E, F, and G, with or without sharp (#), or flat (b), or the corresponding La, Si, Do, Re, Mi, Fa, and Sol can be used to code or index the highest and/or lowest sung notes.

In the preferred embodiment, the invention makes use of the less confusing numerals I through 12, although other alphanumeric combinations, or their representations or appellations in various languages, can also be used to code or index a song according to its highest and/or lowest sung notes.

In one embodiment, the numeral 1 corresponds to C (Do) as the highest note that a performer can sing comfortably. Similarly, 2 corresponds to C#(or Db), 3 to D, 4 to D#(Eb), 5 to E, 6 to F, 7 to F#(Gb), 8 to G, 9 to G#(Ab), 10 to A, 11 to A#(Bb), and 12 to B. Obviously, any alphanumeric combination, or its representation or appellation in various languages, can be chosen to correspond to any chromatic note without exiting the boundaries of this claim. For example, numeral 1 can be chosen to correspond to the highest sung note A, 2 to A#, and so on.

A song can also be coded or indexed for its lowest sung note in a similar fashion.

As an example, the song "America the Beautiful " can be found in hymnals, written in the key of C major, with the highest sung note for the principal voice as E, corresponding to the word "fruit" in the phrase "above the fruited plains".

In a preferred embodiment of this invention, the song can be coded or indexed succinctly as C(5) by any musically competent person, indicating that when the song is played as written, that is in the key of C major, the highest sung note will be 5 (which, as we recall, corresponds to the note E). A more complete coding or indexing for the song may look as follows:

C(05) C#(06) D(07) D∩(08) E (09) F(10)

F#(11) G(12) A(02) A#(03) B(04)

This complete coding will allow each performer to find his or her own optimal key when performing, with a live band for example. Most males perform best in the keys corresponding to numbers 2 to 4 while most females perform best in the keys corresponding to the numbers 9 to 11.

In another embodiment the tonality can be indicated by alternative names in languages other than English.

In another embodiment the chromatic scale of 12 notes can be reduced to diatonic (7 notes), or pentatonic (5 notes).

In another embodiment, the information can be arranged into some geometric pattern such as a loop, or a design to obviate the need for using a number to indicate the highest sung note. For example, in a clock pattern, a key located at 12 o'clock will mean that when the song is played in that tonality, the highest sung note will be B. Similarly, the 3, 6, and 9 o'clock positions will correspond to the highest sung notes of D, F, and G#(or Ab) respectively.

In another embodiment, such as in sing-along recorded materials, a song can be coded by a single high index. Thus if "America the Beautiful" was recorded as written, that is in the key of C, then a high index of 5 can be provided. Thus a performer with a high index of 2 will know that the song is out of his optimal performing range. If the option exists to alter the pitch of the recorded material, such as by altering the playback speed, then the performer can change the tonality down three chromatic intervals, so that the song can now be performed satisfactorily and comfortably.

In another embodiment the song can be coded or indexed for its lowest sung note in a similar fashion.

In another embodiment, such as with audio or video cassettes, compact discs, laser discs, the high indices of the recorded materials can be indicated or displayed, and altered to match the performer's high index.

In another embodiment, the performer's high index can be entered, and the playback hardware and software will automatically adjust to deliver the recorded material at the same index.

In other embodiments, low indices for the recorded material will be similarly handled.

In another embodiment, songs or other musical materials can be provided with a range index to indicate the chromatic interval or distance between the lowest and highest sung notes. Thus, for "America the Beautiful", the range index will be 14 (R=14), indicating that, properly transposed, the song is well within the vocal range of most performers. On the other hands, songs with range indices 20 or higher are best leer to those with better vocal endowment.

I claim:

1. A method for coding or indexing a song, or other recorded musical material, according to its highest and/or lowest sung note, to facilitate the selection by individual performer of the tonality, or key, best suited for his or her vocal attributes, said method of coding comprising:

identifying for each key among twelve major, or minor, keys possible, the highest note to be sung for any song or one of its parts, using the numbers 1 through 12 instead of C, C#or Db, D, D#or Eb, E, F, F#or Gb, G, G#or Ab, A, A#or Bb, and B, respectively, to minimize confusion, listing each of the twelve keys and the associated highest note together on said song or one of its parts.

* * * * *

UNITED STATES PATENT AND TRADEMARK OFFICE

CERTIFICATE OF CORRECTION

PATENT NO. : 5,574,242

DATED : Nov. 12, 1996

INVENTOR(S) : Phiet T. Bui

It is certified that error appears in the above-indentified patent and that said Letters Patent is hereby corrected as shown below:

Column 1 line 56, change "gibed" to "gifted"

Column 2 line 45, change "D" to "D#"

Column 2 line 48, add "G#(01)" between G(12) and A(02)

Column 4 line 5, change "leer" to "left"

Signed and Sealed this

Fifth Day of August, 1997

Attest:

BRUCE LEHMAN

*Attesting Officer* | *Commissioner of Patents and Trademarks*